United States Patent [19]

Lill

[11] 4,006,675
[45] Feb. 8, 1977

[54] FRYING BASKET WITH MOVABLE SHELVES

[75] Inventor: Etchison G. Lill, Wheaton, Ill.

[73] Assignee: Restaurant Technology, Inc., Oak Brook, Ill.

[22] Filed: Jan. 26, 1976

[21] Appl. No.: 652,389

[52] U.S. Cl. .................................. 99/417; 99/448; 99/450; 211/126
[51] Int. Cl.² ......................................... A47J 37/12
[58] Field of Search ............ 99/403, 448, 449, 450, 99/416, 417; 220/19; 211/74, 126, 181

[56] References Cited
UNITED STATES PATENTS

| | | | |
|---|---|---|---|
| 2,586,005 | 2/1952 | Colonna | 220/19 |
| 2,658,444 | 11/1953 | Wheeler | 220/19 X |
| 3,207,059 | 9/1965 | Hirons | 99/450 X |
| 3,455,232 | 7/1969 | Oliver | 99/448 X |
| 3,788,209 | 1/1974 | Artar et al. | 99/448 X |
| D236,414 | 8/1975 | Kroll | 220/19 X |

*Primary Examiner*—Philip R. Coe
*Attorney, Agent, or Firm*—Dressler, Goldsmith, Clement, Gordon & Shore, Ltd.

[57] ABSTRACT

A frying basket for supporting food items, such as pies, to be cooked in an immersed position in a cooking medium. The frying basket has a back wall and two end walls defining an accessible front food loading area opposite the back wall. In the basket, on horizontal supports, are two shelves comprising solid bottom trays mounted on an open framework with divider plates between each tray to form separate compartments for each food item. An upper shelf is mounted above a lower shelf and functions to retain food items on the lower shelf and to support food items as well. Mounted above the second shelf is a retaining cover which functions to retain food items on the upper shelf. Both the upper shelf and the retaining cover are each held in that position by a latch at one of the end walls. To aid in removing food that may tend to stick to the upper shelf, the retaining cover can be unlatched and swung on its pivotal mount upward and away from the upper shelf thereby giving overhead access to food items on the upper shelf. The upper shelf can be unlatched and swung upward and away from the lower shelf. The latching mechanism can be returned to its original latching position to function as a means for holding the upper shelf away from the lower shelf to allow access to food that may tend to stick to the lower shelf.

11 Claims, 4 Drawing Figures

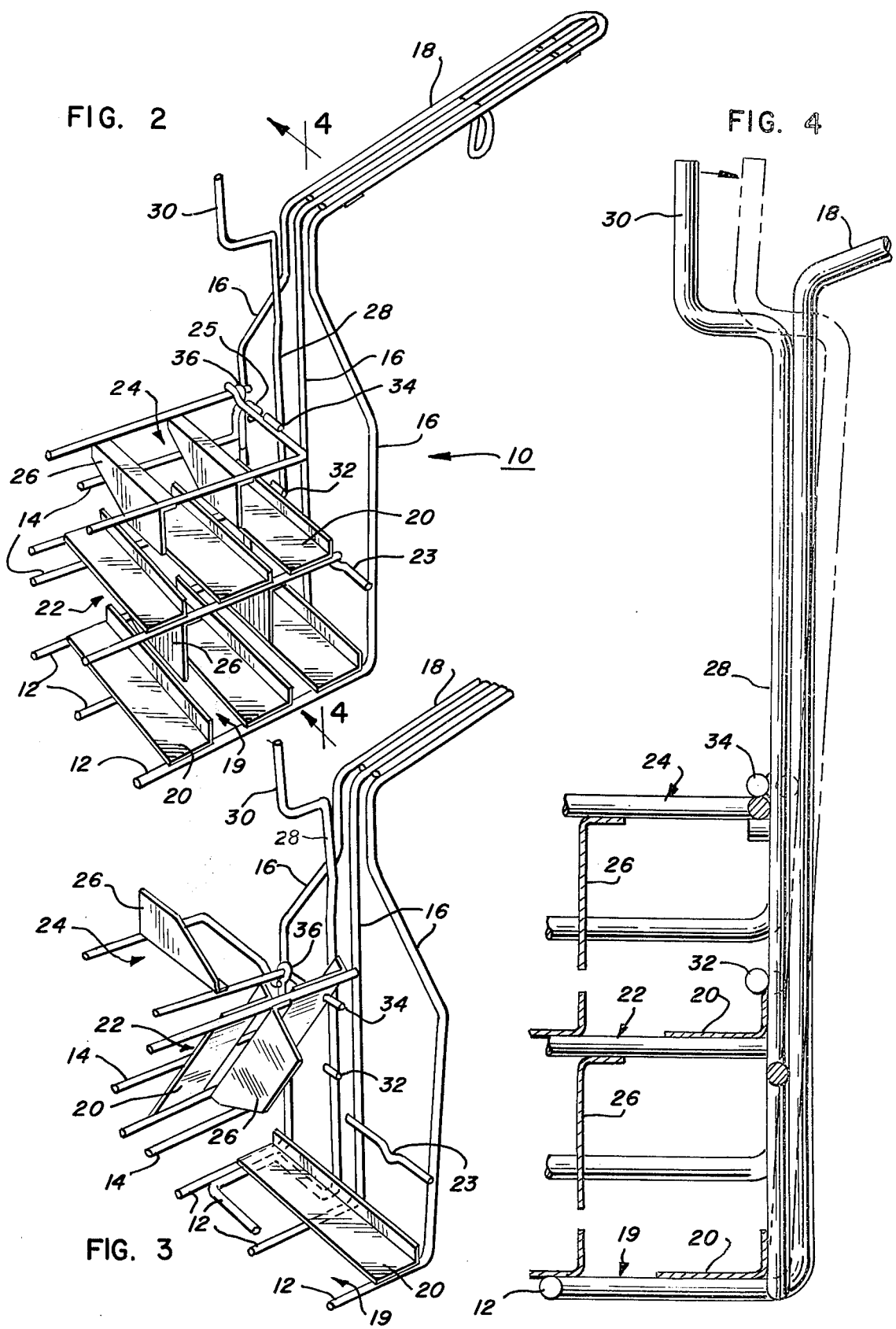

FRYING BASKET WITH MOVABLE SHELVES

BACKGROUND OF THE INVENTION

Frying baskets are used to support food in a cooking medium which is generally a liquid medium with the food immersed therein. Usually where food is prepared or cooked by deep fat frying, a frying basket is immersed in the hot fat to the point where the food is completely covered by the fat.

With some types of food, such as pies, it is desirable that each individual food piece be disposed in a separate compartment to prevent it from sticking to the other food pieces. Shelves for providing separate compartments can be arranged vertically one on top of the other in a frying basket of this type.

In some baskets, the distance between the shelves is such that each shelf acts to prevent food from rising off of the shelf immediately below.

The basket can have three sides: a back wall and two end walls. The fourth side is left open for loading the food pieces into the compartments on each tray. After the food has been cooked, the basket can be removed from the cooking medium and the food pieces can be removed from the compartments by tipping the basket with the open side downward or by removing each food piece from each compartment individually by hand.

With some types of food, the nature of the food piece is such that it can sometimes stick to, or become wedged in, the supporting surfaces of the compartment on the food shelf. This makes removal of the food piece from that compartment difficult. Even shaking the basket with the open side facing downward may not cause all of the food pieces to fall out. Further, the food pieces may start to break apart into smaller pieces in the compartment under such shaking. If the operator trys to reach into the end of the compartment to remove the stuck or wedged food piece, the stuck food piece may break apart and just the front end of the food piece is removed. If the shelf has a depth which is greater than the length of the operator's fingers, it is very difficult for the operator to use his fingers to remove all of the broken food pieces that are sticking to the surfaces of the compartment.

Thus, it would be highly desirable if access were provided to the individual compartments on each food shelf and if such access permitted the operator, where desired, to grasp the food piece along its entire length. This would more easily enable the operator to remove the stuck food piece from the compartment without breaking the stuck food piece into smaller pieces. Further, greater access promotes self discharge of the food pieces without manually removing them individually.

SUMMARY OF THE INVENTION

The instant invention is used in a frying basket which supports food to be cooked in an immersed position in a cooking medium, such as pies in high temperature oil or liquid fat. The frying basket has four sides: two opposing end walls, a back wall, and an accessible front loading area opposite the back wall. The basket has one or more shelves horizontally disposed one above the other and a retaining cover disposed above the top shelf. The distance between the shelves is such that each shelf acts to prevent food from rising off of the shelf immediately below. A retaining cover acts to prevent food from rising off of the top shelf immediately below the retaining cover. Further, each shelf has divider plates depending vertically downward from the underside of the shelf and extending towards the shelf immediately below to form compartments therein. A separate food piece can then be placed on the shelves in the separate compartments from the accessible front loading area.

The retaining cover and all shelves, except for the bottom one, are movable away from the shelf immediately below. In addition, a latching mechanism functions to hold down the retaining cover and shelves in the horizontal food retaining and supporting positions when the frying basket is loaded with food pieces and immersed in the cooking medium.

The latching mechanism can be released to allow the retaining cover and subsequently each shelf, except for the bottom shelf, to be moved away from the shelf immediately below to a second position. The latching mechanism is constructed and arranged to permit it to be returned to its original latching position for supporting the shelves in their second position.

The movement of the retaining cover away from the top shelf and the subsequent movement of each shelf away from the shelf immediately below it permits an operator to have access to each lower shelf. This access extends the whole shelf depth, promotes release and discharge of the food items, and when necessary, allows the operator to grasp a food piece that may be sticking to the shelf in an individual compartment. Such access allows the operator to grasp the whole piece of food and remove it from the shelf with less chance of causing the stuck food piece to break into smaller pieces.

The latching mechanism and knob for operating the latching mechanism is arranged near the frying basket carrying handle so that the operator can unlatch the shelves with the thumb of the hand that he is using to carry and hold the frying basket. Further, after moving the retaining cover and an upper shelf away from the next lower shelf, the operator can operate the latch back to the latching position to permit the upper shelf to rest upon the latching mechanism and be held in a position away from the next lower shelf.

Other advantages and features of the present invention will become readily apparent from the following detailed description and accompanying drawings.

BRIEF DESCRIPTION OF THE DRAWINGS

In the accompanying drawings forming part of the specification and in which like numerals are employed to designate like parts throughout the same.

FIG. 2 is a perspective view of an end portion of the frying basket of FIG. 1;

FIG. 3 is a perspective view of the frying basket of FIG. 1 showing portions moved to a second position; and FIG. 4 is a cross-sectional elevational view taken substantially along line 3—3 of FIG. 2 showing a latching mechanism in latched and unlatched positions.

DESCRIPTION OF A PREFERRED EMBODIMENT

Figure 1:
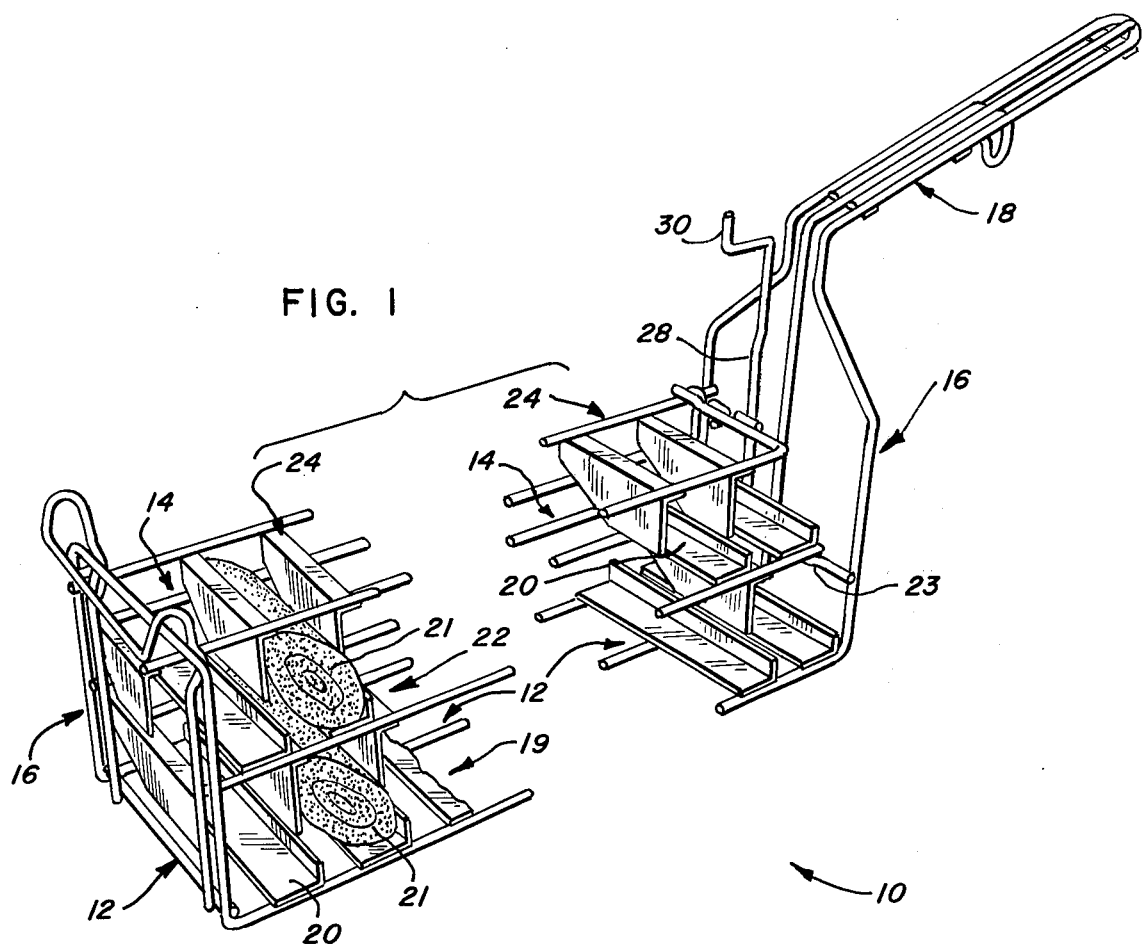
FIG. 1 is a perspective view of a frying basket in accordance with this invention shown supporting food items in several of its compartments.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Referring now to the drawings, in FIG. 1 the relevant elements of a typical frying basket 10 are shown. The particular frying basket shown herein for purposes of illustrative disclosure corresponds generally to the frying basket shown in the U.S. Pat. No. Des. 406,391.

Frying basket 10 includes a rigid open-framed base 12 constructed of wire. The base supports an open-framed back wall 14 constructed of wire and open-framed end walls 16. In FIG. 1 and 2, the end walls are shown constructed of rigid wire 16. At the top of one of the end walls, and integral with it, is a carrying handle 18. The base 12 comprises a lower food shelf 19 which is comprised of trays 20 mounted non-contiguously parallel across the base 12. A food piece 21 is shown on one of these lower shelf trays in FIG. 1. An upper food shelf 22 depends from the back wall 14 and is supported at the front by horizontal support member 23. Like the lower shelf 19, the upper food shelf 22 is comprised of trays 20 arranged non-contiguously parallel across the upper shelf wire framework. A food piece 21 is shown on one of these upper shelf trays in FIG. 1. A retaining cover 24 is disposed from the back wall extending above the upper shelf 22. The retaining cover rests in the horizontal position on a cantilever support member 25 as shown in FIG. 2. In FIG. 2, divider plates 26 are shown depending downwards vertically from both the retaining cover and the underside of the upper shelf 22. These serve to form compartments on the upper shelf and lower shelf respectively for receiving individual food pieces.

The dimensions and arrangements of the trays, divider plates, wire framework, base, back wall, and end wall are such that the food pieces supported on the shelves will not be completely surrounded by solid metal surfaces. Thus, the food is exposed substantially to the cooking medium which can flow between, around and through the members comprising the frying basket.

In FIG. 2 a latch 28 is shown as a vertical member depending from the base alongside the end wall 16. The top of the latch 28 is formed into a latch knob 30 for operation by a thumb or finger of a hand that can simultaneously grasp the carrying handle 18.

As shown in FIG. 2, an upper shelf latch prong 32 protrudes over the edge of a tray 20 on the upper shelf 22 to hold the upper shelf down in its food supporting position. Similarly, a retaining cover latch prong 34 protrudes over the edge of the retaining cover 24 to hold the retaining cover down in its food retaining position. In FIG. 4, the latch 28 is shown in solid line in the first latched position wherein the retaining cover latching prong 34 and the upper shelf latching prong 32 are holding down the retaining cover 24 and the upper shelf 22 respectively.

The latch 28 can be moved to the unlatched position as shown in dashed lines in FIG. 4. In this position the retaining cover latching prong 34 and the upper shelf latching prong 32 no longer project over the retaining cover 24 and the upper shelf 22 respectively. This allows the retaining cover 24 and the upper shelf 22 to be moved away from the horizontal position. In FIG. 2 and FIG. 3, the retaining cover is shown pivotally mounted along the top of the back wall 14 at the pivotal support 36. The retaining cover 24 can be rotated about the pivotal support 36 to a position of repose against the back wall 14. In FIG. 3 the retaining cover 24 is shown rotated to, and held at, about 180° from its normal food retaining position. The retaining cover 24 can rotate further, about another 70°, until the frame of the retaining cover rests against the outside of the back wall 14. This allows full access to food pieces supported on the upper shelf. With the latch 28 held in the unlatched position as shown by the dashed lines in FIG. 4, the upper shelf 22 can then be rotated about a pivotal mounting on the back wall 14. FIG. 3 shows the upper shelf 22 rotated about its pivotal mounting (not shown) to a position away from, and allowing full access to, the lower shelf 19.

When the upper shelf 22 has been rotated sufficiently away from the lower shelf 19, the latch 28 can be allowed to assume its normal latched position. In this position, the retaining cover latching prong 34 can be used to support the underside of the upper shelf 22. In FIG. 3, the retaining cover latching prong 34 is shown supporting the upper shelf 22 by contacting one of the trays 20 at its edge next to the end wall 16. In this position, the upper shelf 22 is held out of the way of the lower shelf 19 allowing direct, full and overhead access to the lower shelf 19 for removing food pieces therefrom.

It is to be understood that no limitation with respect to the specific apparatus illustrated herein is intended or should be inferred. For example, the latch 28 is shown in FIGS. 1, 2, 3 and 4 as being a wire rod biased against the end wall 16 in the latched position by the inherent resiliency of the cantilevered construction. Instead, the latch could be a lever extending alongside one of the end walls but biased against the end wall and over the upper shelf and retaining cover with a separate spring. The latch could also be a flat plate disposed along the end wall instead of a wire rod. The latching prongs which hold down the retaining cover and upper shelf could consist of a plurality of prongs. Further the number of shelves that could be pivotally mounted for swinging up and away from a shelf immediately below is not limited to just one upper shelf. A plurality of such shelves can be used in such a frying basket.

While preferred constructional features of the invention are embodied in the structure illustrated herein it is to be understood the changes and variations may be made by those skilled in the art without departing from the spirit and scope of the appended claims.

What is claimed is:

1. In a frying basket for supporting food to be cooked in an immersed position in a cooking medium, said frying basket having an open-framed base supporting an open-framed back wall and two opposing open-framed end walls; a carrying handle mounted on said frying basket; food shelf means on said base for carrying food; said frying basket defining an accessible front food loading area opposite said back wall; an open-framed retaining cover disposed parallel to, and above, said food shelf for preventing food from rising off said shelf in a food retaining position and being movable away from the shelf; and latching means mounted on said frying basket movable from a first latching position in which said retaining cover is maintained in said food retaining position to a second unlatched position in which said cover may be moved away from said shelf to a second position spaced away from said shelf to facilitate the removal of food from said frying basket, said latching means being returnable to said first latching position to support said cover in said second position as food is being removed.

2. The frying basket as set forth in claim 1, in which said food shelf comprises one-sided solid bottom trays for food items of a predetermined size, said trays being located in non-contiguous parallel alignment across said base to allow a cooking medium to flow between said trays; and in which said open-framed retaining cover comprises vertically depending parallel food divider plates aligned with said trays for locating and retaining food therebetween.

3. The frying basket as set forth in claim 1, in which said latching means comprises a substantially vertical member adjacent to one of said open-framed end walls and being movable away from said end wall from said first latching position to said second unlatched position; a retaining cover latching prong protruding from, and movable with, said vertical member to protrude over part of said retaining cover to engage and hold down the cover in said first latching position and to move away from, and release, the cover in said second unlatched position; and a support prong disposed above said latching prong and protruding from, and movable with, said vertical member to permit said retaining cover to move past and above said support prong with said member in said second unlatched position and to subsequently permit said cover to be supported by the support prong when said member is returned to said first latching position.

4. The frying basket as set forth in claim 3, in which said vertical member is a resilient member and is mounted to be urged toward said first latching position.

5. The frying basket as set forth in claim 1, in which said retaining cover is pivotally mounted on said basket, and means for pivotally mounting said cover on said basket.

6. In a frying basket for supporting food to be cooked in an immersed position in a cooking medium, said frying basket having an open-framed base supporting an open-framed back wall and two opposing open-framed end walls; a carrying handle mounted on said frying basket; said frying basket defining an accessible front loading area opposite said back wall; a lower food shelf on said base for carrying food; an upper food shelf for carrying food disposed parallel to, and above, said lower food shelf; said upper food shelf having means for preventing food from rising off said lower food shelf in a food retaining position and being movable away from said lower shelf; an open-framed retaining cover disposed parallel to, and above said upper food shelf; said retaining cover having means for preventing food from rising off said upper food shelf in a food retaining position and being movable away from the upper shelf; and latching means mounted on said frying basket movable from a first latching position, in which said upper shelf and said cover are each maintained in said food retaining positions, to a second unlatched position in which said cover is spaced away from said upper shelf to facilitate the removal of food from said upper shelf and subsequently in which said upper shelf is spaced away from said lower shelf to a second position to facilitate the removal of food from said lower shelf, said latching means being returnable to said first latching position to support said upper shelf in said second position as food is being removed from said lower shelf.

7. The frying basket as set forth in claim 6, in which: said lower shelf and said upper shelf each comprises one-sided solid bottom trays for food items of a predetermined size, said trays being located in non-contiguous parallel alignment between said end walls to allow a cooking medium to flow between said trays; said upper shelf further comprising vertically depending parallel food divider plates aligned with said trays of said lower shelf; and in which said open-framed retaining cover comprises vertically depending parallel food divider plates aligned with said trays of said upper shelf for locating and retaining food between vertically spaced pairs thereof.

8. The frying basket as set forth in claim 6, in which said latching means comprises: a substantially vertical member adjacent to one of said open-framed end walls and being movable away from said end walls from said first latching position to a second unlatched position; an upper shelf latching prong protruding from said vertical member to protrude over part of said upper shelf to hold down said upper shelf in said first latching position and to move away from, and release, said upper shelf in said second unlatched position; and a retaining cover latching prong disposed above said upper shelf latching prong and protruding from said vertical member to permit both said retaining cover and said upper shelf to move past and above the cover latching prong with said member in said second unlatched position and to subsequently permit the upper shelf to be supported by the cover latching prong when said vertical member is returned to said first latching position.

9. The frying basket as set forth in claim 8, in which said vertical member is a resilient member subjected to a biasing means for urging said member toward said first latching position.

10. The frying basket as set forth in claim 6, in which said upper shelf and said cover are each pivotally mounted on said basket, said cover being swingable to said position spaced away from said upper shelf and said upper shelf being swingable to said second position.

11. The frying basket as set forth in claim 6, in which said carrying handle extends laterally from adjacent the top of one of said open-framed end walls, said latching means being operable from said handle; and in which said retaining cover is mounted pivotally along the length of the top of said open-framed back wall for assuming a horizontal food retaining position above said upper shelf and for swinging upward and away from said horizontal food retaining position to a reposing angle of greater than 90° from said horizontal food retaining position; and said upper food shelf is mounted pivotally along the length of said open-framed back wall for swinging upward and away from said lower food shelf to said second position.

* * * * *